United States Patent
Saxe (10) Patent No.: US 10,474,818 B1
(45) Date of Patent: Nov. 12, 2019

(54) METHODS AND DEVICES FOR DETECTION OF MALWARE

(71) Applicant: Invincea, Inc., Fairfax, VA (US)

(72) Inventor: Joshua Daniel Saxe, Los Angeles, CA (US)

(73) Assignee: Invincea, Inc., Reston, VA (US)

( * ) Notice: Subject to any disclaimer, the term of this patent is extended or adjusted under 35 U.S.C. 154(b) by 57 days.

(21) Appl. No.: 15/907,817

(22) Filed: Feb. 28, 2018

Related U.S. Application Data (63) Continuation of application No. 14/716,290, filed on May 19, 2015, now Pat. No. 9,940,459.

(60) Provisional application No. 62/000,305, filed on May 19, 2014.

(51) Int. Cl.
| | |
|---|---|
| G06F 21/56 | (2013.01) |
| G06F 16/13 | (2019.01) |
| G06F 16/11 | (2019.01) |

(52) U.S. Cl.
CPC ......... *G06F 21/565* (2013.01); *G06F 16/116* (2019.01); *G06F 16/13* (2019.01); *G06F 21/561* (2013.01); *G06F 2221/034* (2013.01)

(58) Field of Classification Search
CPC ............. G06F 21/565; G06F 17/30076; G06F 17/30091; G06F 2221/034; G06F 21/56–568; H04W 12/1208; H04L 63/145
USPC ........................................................ 726/23
See application file for complete search history.

(56) References Cited

U.S. PATENT DOCUMENTS

| | | | |
|---|---|---|---|
| 6,226,629 B1 | 5/2001 | Cossock | |
| 8,028,338 B1 | 9/2011 | Schneider et al. | |
| 8,095,981 B2 | 1/2012 | Rabinovitch et al. | |
| 8,291,497 B1 | 10/2012 | Griffin et al. | |
| 8,505,094 B1 | 8/2013 | Xuewen et al. | |
| 8,521,667 B2 | 8/2013 | Zhu et al. | |
| 9,015,814 B1 | 4/2015 | Zakorzhevsky et al. | |

(Continued)

FOREIGN PATENT DOCUMENTS

| | | |
|---|---|---|
| EP | 3018879 | 5/2016 |
| WO | WO 2017/223294 | 12/2017 |

OTHER PUBLICATIONS

Office Action for U.S. Appl. No. 14/212,659, dated May 16, 2019, 36 pages.

(Continued)

*Primary Examiner* — Matthew T Henning
(74) *Attorney, Agent, or Firm* — Cooley LLP (57) ABSTRACT

An apparatus includes a database configured to store a collection of files. The apparatus also includes a counter module configured to calculate a frequency of a data feature in the collection of files. The apparatus also includes a signature generation module operatively coupled to the counter module. The signature generation module is configured to generate a malware signature based on the frequency of the data feature in the collection of files. The malware signature includes an indication of one or more criterion for the data feature, and the malware signature is associated with a malware. The apparatus also includes a communication module configured to receive a target file, and a detection module operatively coupled to the communication module. The detection module is configured to classify the target file as the malware when the target file meets the one or more criterion of the malware signature.

21 Claims, 6 Drawing Sheets

(56) References Cited

U.S. PATENT DOCUMENTS

| | | | |
|---|---|---|---|
| 9,672,358 | B1 | 6/2017 | Long et al. |
| 9,690,938 | B1 | 6/2017 | Saxe et al. |
| 9,705,904 | B1 | 7/2017 | Davis et al. |
| 9,910,986 | B1 | 3/2018 | Saxe et al. |
| 9,940,459 | B1 | 4/2018 | Saxe |
| 10,104,100 | B1 | 10/2018 | Bogorad |
| 10,303,875 | B1 | 5/2019 | Saxe et al. |
| 10,318,735 | B2 | 6/2019 | Saxe |
| 2005/0050335 | A1 | 3/2005 | Liang et al. |
| 2005/0166046 | A1 | 7/2005 | Bellovin et al. |
| 2005/0187740 | A1 | 8/2005 | Marinescu |
| 2005/0223238 | A1 | 10/2005 | Schmid et al. |
| 2006/0015630 | A1 | 1/2006 | Stolfo |
| 2008/0127336 | A1 | 5/2008 | Sun |
| 2008/0140662 | A1* | 6/2008 | Pandya ............... G11C 15/00 |
| 2009/0044024 | A1 | 2/2009 | Oberheide et al. |
| 2009/0100055 | A1 | 4/2009 | Wang |
| 2009/0172815 | A1 | 7/2009 | Gu |
| 2009/0293125 | A1 | 11/2009 | Szor |
| 2010/0115620 | A1 | 5/2010 | Alme |
| 2011/0154495 | A1 | 6/2011 | Stranne |
| 2011/0179484 | A1 | 7/2011 | Tuvell |
| 2011/0214161 | A1 | 9/2011 | Stolfo et al. |
| 2012/0158626 | A1 | 6/2012 | Zhu et al. |
| 2012/0159620 | A1 | 6/2012 | Seifert et al. |
| 2012/0210423 | A1 | 8/2012 | Friedrichs et al. |
| 2012/0233693 | A1 | 9/2012 | Stites et al. |
| 2013/0167236 | A1 | 6/2013 | Sick |
| 2014/0090061 | A1 | 3/2014 | Avasarala et al. |
| 2014/0298460 | A1 | 10/2014 | Xue et al. |
| 2015/0242626 | A1 | 8/2015 | Wang et al. |
| 2015/0302268 | A1 | 10/2015 | Collet et al. |
| 2015/0312189 | A1 | 10/2015 | Lee |
| 2015/0379427 | A1 | 12/2015 | Dirac et al. |
| 2016/0014149 | A1 | 1/2016 | Bradley et al. |
| 2016/0239706 | A1 | 8/2016 | Dijkman et al. |
| 2017/0017795 | A1 | 1/2017 | DiGiambattista |
| 2017/0085585 | A1 | 3/2017 | Morkovsky |
| 2017/0134404 | A1 | 5/2017 | Machlica et al. |
| 2017/0372071 | A1 | 12/2017 | Saxe |
| 2018/0041536 | A1 | 2/2018 | Berlin |
| 2018/0285740 | A1 | 10/2018 | Smyth et al. |

OTHER PUBLICATIONS

Dahl, et al., "Large-scale malware classification using random projections and neural networks." International Workshop on Acoustic Signal Enhancement 2012, Institute of Electrical and Electronics Engineers (2013); 3422-3426.

Extended European Search Report for European Application No. 17816199.8 dated Apr. 9, 2019, 8 pages.

Wang, Y., et al., "A deep learning approach for detecting malicious JavaScript code." Security and Communications Networks (2016); 9(11): 1520-1534.

Office Action for U.S. Appl. No. 15/877,676, dated Sep. 14, 2018, 6 pages.

Notice of Allowance for U.S. Appl. No. 15/877,676, dated Jan. 18, 2019, 5 pages.

Notice of Allowance for U.S. Appl. No. 15/630,495, dated Jan. 28, 2019, 14 pages.

International Preliminary Report on Patentability for International Application No. PCT/US2017/038715, dated Dec. 25, 2018, 7 pages.

Gilbert, "Convolutional Neural Networks for Malware Classification", Oct. 20, 2016, a thesis presented for the degree of Master in Artificial Intelligence, pp. 1-100.

Kolosnjaji, et al, "Empowering Convolutional Networks for Malware Classification and Analysis", no date provided, Technical University of Munich, pp. 1-8.

Office Action for U.S. Appl. No. 14/212,659, dated Aug. 3, 2018, 32 pages.

Schroff, F. et al., "FaceNet: A Unified Embedding for Face Recognition and Clustering," Computer Vision Foundation, 2015 [online], Retrieved from the Internet: <URL: https://www.cv-foundation.org/openaccess/content_cvpr_2015/papers/Schroff_FaceNet_A_Unified_2015_CVPR_paper.pdf>, pp. 815-823.

Doersch, C., "Tutorial on Variational Autoencoders," arXiv:1606.05908v2 [stat.ML], Aug. 16, 2016, 23 pages.

Office Action for U.S. Appl. No. 14/212,659, dated Jul. 22, 2016, 27 pages.

Office Action for U.S. Appl. No. 14/212,659, dated May 19, 2017, 29 pages.

Office Action for U.S. Appl. No. 14/212,659, dated Nov. 13, 2017, 31 pages.

Office Action for U.S. Appl. No. 14/716,290, dated Aug. 4, 2016, 15 pages.

Office Action for U.S. Appl. No. 14/716,290, dated Jun. 1, 2017, 14 pages.

Office Action for U.S. Appl. No. 15/228,728, dated Oct. 21, 2016, 9 pages.

Office Action for U.S. Appl. No. 15/616,391, dated Sep. 22, 2017, 6 pages.

International Search Report and Written Opinion for International Application No. PCT/US2017/038715, dated Sep. 6, 2017, 8 pages.

Search Report for UK Patent Application No. GB 1712454.6, dated Jan. 15, 2018, 4 pages.

Avira Virus Lab, Natural language descriptor sample page, [Online], Retrieved from the Internet: <https://web.archive.org/web/20101006002848/https://www.avira.com/en/support-virus-lab>, Retrieved on Oct. 30, 2017, 2 pages.

Berlin, K. et al., "Malicious Behavior Detection using Windows Audit Logs," Proceedings of the 8th ACM Workshop on Artificial Intelligence and Security, Oct. 16, 2015, pp. 35-44.

Bulut, I. et al., "Mobile malware detection using deep neural network," Signal Processing and Communications Applications Conference (SIU), May 15-18, 2017 (with English Abstract).

Griffin, K. et al., "Automatic Generation of String Signatures for Malware Detection," International Workshop on Recent Advances in Intrusion Detection, Springer Berlin Heidelberg, 2009, 29 pages.

Kolter, J. Z. et al., "Learning to Detect and Classify Malicious Executables in the Wild," Journal of Machine Learning Research, vol. 7, 2006, pp. 2721-2744. Based on an earlier work: Learning to Detect Malicious Executables in the Wild, in Proceedings of the Tenth ACM SIGKDD International Conference on Knowledge Discovery and Data Mining, ACM, 2004. http://doi.acm.org/10.1145/1014052.1014105.

Kong, D. et al., "Discriminant malware distance learning on structural information for automated malware classification," Proceedings of the 19th ACM SIGKDD International Conference on Knowledge Discovery and Data Mining, KDD'13, Aug. 11-14, 2013, Chicago, Illinois, pp. 1357-1365.

Morris, R., "Counting large numbers of events in small registers," Communications of the ACM, vol. 21, No. 10, Oct. 1978, pp. 840-842.

ThreatExpert—Automated Threat Analysis, Geographic Distribution of Threats, [Online], Jan. 15, 2013, Retrieved from the Internet: <URL: http://web.archive.org/web/20130115040419/http://threatexpert.com/>, Retrieved on Jan. 20, 2017, 2 pages.

Sathyanarayan, V. S. et al., "Signature Generation and Detection of Malware Families," Proceedings of the 13th Australasian Conference on Information Security and Privacy, ACISP 2008, LNCS 5107, Yi Mu et al. (eds.). Springer-Verlag, Heidelberg, pp. 336-349 (2008).

Saxe, J. et al., "Deep Neural Network Based Malware Detection Using Two Dimensional Binary Program Features," arXiv:1508.03096v2, Sep. 3, 2015, 10 pages.

Saxe, J. et al., "Deep Neural Network Based Malware Detection Using Two Dimensional Binary Program Features," 2015 10th International Conference on Malicious and Unwanted Software: "Know Your Enemy" (Malware), 2015, pp. 11-20.

Saxe, J. et al., "Visualization of Shared System Call Sequence Relationships in Large Malware Corpora," Proceedings of the ninth internaitonal symposium on visualization for cyber security, VizSec '12, Oct. 15, 2012, Seattle, WA, 8 pages.

(56) References Cited

OTHER PUBLICATIONS

Saxe, J. et al., "CrowdSource: Automated Inference of High Level Malware Functionality from Low-Level Symbols Using a Crowd Trained Machine Learning Model," IEEE, 9th International Conference, Oct. 28, 2014, pp. 68-75.

Saxe, J. "Why Security Data Science Matters and How its Different: Pitfalls and Promises of Data Science Based Breach Detection and Threat Intelligence," BlackHat USA 2015, Briefings Aug. 1-6, 2016 [Online], Retireved from the Internet: <URL: https://www.blackhat.com/us-15/briefings.html>, Retrieved on Jan. 20, 2017, 1 pages.

Saxe, J. Presentation: "Why Security Data Science Matters and How its Different: Pitfalls and Promises of Data Science Based Breach Detection and Threat Intelligence," Invincea, 2015, 103 pages.

Saxe, J. et al., "eXpose: A Character-Level Convolutional Neural Network with Embeddings for Detecting Malicious URLs, File Paths and Registry Keys," arXiv:1702.08568v1 (Feb. 27, 2017), 18 pages.

Van Durme, B. et al., "Probabilistic counting with randomized storage," In Proceedings of the 21st International Joint Conference on Artificial Intelligence (IJCAI'09), Hiroaki Kitano (ed.). (2009), Morgan Kaufmann Publishers Inc., San Francisco, CA, USA, 1574-1579.

* cited by examiner

```
rule APT1 : APT1
{
    meta:
        description = "Autogenerated Yara Signature for a527621787774b5ae46fa13f61adfe6a7508fbf49dcf0267813f5b74a7"
        original_filepath = "/home/josh.saxe/data/test_binaries/mt1/a527621787774b5ae46fa13f61adfe6a7508fbf49dcf0267813f5b74a7"
    strings:
        $string0 = "CreateService failed with error %d"... seen 4 times out of 502824 samples.
        $string1 = "Mozilla/4.0 (compatible; MSIE 6.0;"... seen 40 times out of 502824 samples.
        $string2 = "OpenService failed with error %d"
        $string3 = "\"%s\" -startsvc"
        $string4 = "-startsvc"
        $string5 = "OpenSCManager failed with error %d"... seen 9 times out of 502824 samples.
        $string6 = "Mozilla/4.0 (compatible; Windows NT 5.1; MSIE 7.0)"... seen 7 times out of 502824 samples.
        $string7 = "xyhost.xer"
        $string8 = "dlserver"
        $string9 = "ABCDEFGHIJKLMNOPQRSTUVWXYZabcdefghijklmnopqrstuvwxyz01"... seen 2 times out of 502824 samples.
        $string10 = "ABCDEFGHIJKLMNOPQRSTUVWXYZ"... seen 3 times out of 502824 samples.
        $string11 = "thequickbrownfoximpsoverlazydog"
        $string12 = "--install"... seen 30 times out of 502824 samples.
    condition:
        6 of them
}
```

FIG. 6

METHODS AND DEVICES FOR DETECTION OF MALWARE

CROSS-REFERENCE TO RELATED APPLICATIONS

This application is a continuation of U.S. patent application Ser. No. 14/716,290, filed May 19, 2015 and titled "METHODS AND DEVICES FOR DETECTION OF MALWARE," which claims priority to U.S. Provisional Application No. 62/000,305 titled "METHODS AND DEVICES FOR DETECTION OF MALWARE", now U.S. Pat. No. 9,940,459, filed May 19, 2014, the entire disclosure of each of which is incorporated herein by reference.

GOVERNMENT LICENSE RIGHTS

This invention was made with government support under contract no. FA8750-10-C-0169 awarded by the Defense Advanced Research Projects Agency (DARPA). The Government has certain rights in the invention.

BACKGROUND

Some embodiments described herein relate generally to generation of signatures for malware detection.

Malware, short for malicious software, is software designed to infiltrate a computer system without the owner's informed consent. The expression is a general term used by computer professionals to mean a variety of forms of hostile, intrusive, or annoying software and/or program code. Malware presents security risks and/or issues for computer systems.

The problem of identifying malware is difficult because a small fraction of files on computing devices, either at rest or in motion, are actually malware, let alone malware that are similar to any other kind or form of malware sample. Accordingly, even detection techniques that have a very low false positive rate typically generate large volumes of false positives when tasked with analyzing millions of files.

Accordingly, a need exists for automatic malware capability identification using on a signature, the signature generated based on specified malware sample(s), which can detect similar malware samples.

SUMMARY

In some embodiments, an apparatus includes a database configured to store a collection of files. The apparatus also includes a counter module implemented in at least one of a memory or a processing device, the counter module operably coupled to the database. The counter module is configured to calculate a frequency of a data feature in the collection of files. The apparatus also includes a signature generation module operatively coupled to the counter module. The signature generation module is configured to generate a malware signature based on the frequency of the data feature in the collection of files. The malware signature includes an indication of one or more criterion for the data feature, and the malware signature is associated with a malware. The apparatus also includes a communication module configured to receive a target file, and a detection module operatively coupled to the communication module. The detection module is configured to classify the target file as the malware when the target file meets the one or more criterion of the malware signature.

DESCRIPTION

As used herein, the singular forms "a," "an" and "the" include plural referents unless the context clearly dictates otherwise. Thus, for example, the term "a communication module" is intended to mean a single module or a combination of modules.

In some embodiments, an apparatus includes a database configured to store a collection of files. The apparatus also includes a counter module implemented in a processing device or a memory. The counter module is operably coupled to the database and is configured to filter the collection of files for the data feature to identify a set of filtered files. The counter module is also configured to calculate a frequency of a data feature in the set of filtered files. The apparatus also includes a signature generation module configured to generate a malware signature based on the frequency of the data feature in the set of filtered files. The malware signature includes one or more criterion for the data feature and is associated with a malware. The apparatus also includes a communication module configured to receive a target file, and a detection module configured to classify the target file as the malware when the target file meets the one or more criterion of the malware signature.

In some embodiments, a non-transitory processor-readable medium stores code representing instructions to be executed by a processor. The code includes code to cause the processor to receive a collection of files, and calculate a frequency of each data feature of a set of data features in the collection of files. The code also includes code to cause the processor to receive a selection of malware files from the collection of files. The selection of malware files is associated with a malware. The code also includes code to cause the processor to calculate a frequency of each data feature from the set of data features in the selection of malware files. The code also includes code to cause the processor to generate a malware signature based on the frequency of each data feature in the collection of files and based on the frequency of each data feature in the selection of malware files. The malware signature includes an indication of a criterion for one or more data features from the set of data features, and is associated with the malware. The code also includes code to cause the processor to receive a target file and classify the target file as the malware when the target file meets the criterion of the malware signature. The code also includes code to cause the processor to transmit an indication of the classification of the target file as malware. The indication includes one or more recommended actions.

Figure 1A:
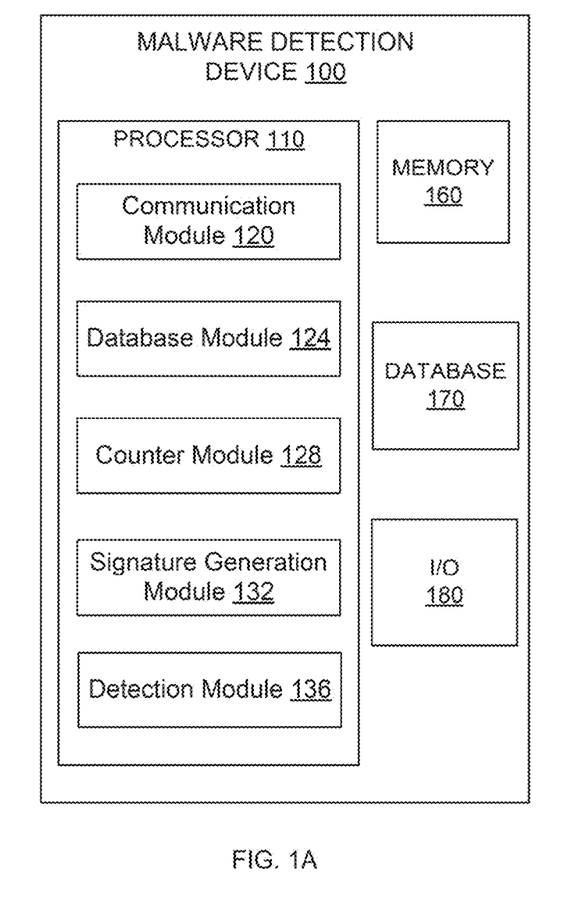
FIG. 1A is a schematic diagram that illustrates a malware detection device configured to detect malware in a target file, according to an embodiment.

FIG. 1A is a schematic diagram of a malware detection device 100 configured to identify whether a target file is malware based on data features of the target file. The file can be in any suitable format, including, but not limited to, an executable, a binary file, an assembly language file, a file derived therefrom, and/or the like. The term "data feature" as used herein with reference to a file, is intended to encompass any recognizable and/or detectable aspect of the file including, but not limited to, text in the file, a byte sequence in the file, a textual byte sequence in the file, a function call in the file, a functionality of the file, a capability of the file, a byte sequence in the file, a bit sequence in the file and combinations thereof. Examples of data features include, but are not limited to, keywords (such as "FindWindow", "PrintWindow", "screenshot", etc.), Application Programming Interface (API) symbols, DLL file import functions, functions for accessing and/or referencing registry keys, and/or the like.

The term "functionality" and/or "capability" as used herein with reference to a file, is intended to encompass any process(es), step(s), executable action(s), and/or the like that the file can be capable of performing when executed. The functionality can include high level actions (i.e., by a high level programming language) and/or low level actions (i.e., by low level programming, such as assembly language programming). Example capability/functionality can be "implements keystroke logging," "turns on webcam," "takes screenshots of user's desktop," "communicates via Internet Relay Chat," and/or the like. In some embodiments, the capability/functionality can be inferred, as generally disclosed in U.S. patent application Ser. No. 14/212,659 titled "METHODS AND APPARATUS FOR DETECTION OF FUNCTIONALITY", filed Mar. 14, 2014, the entire disclosure of which is incorporated herein by reference.

In some embodiments, the malware detection device 100 is configured to identify whether the target file is a specific type of malware based on a signature associated with and/or corresponding to the specific type of malware. In some embodiments, the signature can be user specified. In some embodiments, and as will be explained in more detail below, the signature can be generated based on the number of times one or more data features are present in a collection of files.

The malware detection device 100 can be any device with certain data processing and/or computing capabilities such as, for example, a server, a workstation, a compute device, a tablet, a mobile device, and/or the like. As shown in FIG. 1A, the malware detection device 100 includes a processor 110, a memory 160, input/output interfaces 180, and/or other component(s) (not shown in FIG. 1A). FIG. 1A also illustrates that the malware detection device 100 includes a database 170. In other embodiments, the database can be external to the malware detection device but communicatively coupled to the malware detection device by, for example a network. In yet other embodiments, the database 170 and the memory 160 can be the same.

The memory 160 can be, for example, a Random-Access Memory (RAM) (e.g., a dynamic RAM, a static RAM), a flash memory, a removable memory, and/or so forth. In some embodiments, instructions associated with performing the operations described herein (e.g., fault detection) can be stored within the memory 160 and executed at the processor 110.

The processor 110 can be any element configured to execute program code, such as a general purpose processor, an application-Specific Integrated Circuit (ASIC), a Programmable Logic Device (PLD), a Digital Signal Processor (DSP), a field-programmable gate array (FPGA), and/or the like, and combinations thereof. The processor 110 includes a communication module 120, a database module 124, a counter module 128, a signature generation module 132, a detection module 136, and/or other module(s) (not shown in FIG. 1A).

Each module in the processor 110 can be any combination of hardware-based module (e.g., a field-programmable gate array (FPGA), an application specific integrated circuit (ASIC), a digital signal processor (DSP)), hardware-based module executing software (e.g., a module of computer code stored in the memory 160 and/or executed at the processor 110), and/or a combination of hardware- and software-based modules. Each module in the processor 110 is capable of performing one or more specific functions/operations as described in further detail with respect to FIG. 1A. In some embodiments, the modules included and executed in the processor 110 can be, for example, a process, application, virtual machine, and/or some other hardware and/or software module (stored in memory and/or executing in hardware). The processor 110 can be any suitable processor configured to run and/or execute those modules.

In some embodiments, the processor 110 can include more or less modules than those shown in FIG. 1A. In some embodiments, the malware detection device 100 can include more components than those shown in FIG. 1A. In some embodiments, the malware detection device 100 can include or be coupled to an output device (e.g., a printer, a monitor, a speaker, a display device such as a touch screen, etc.), such that an output of the malware detection device (e.g., an indication of whether the target file is malware) can be presented to a user via the output device.

Figure 1B:
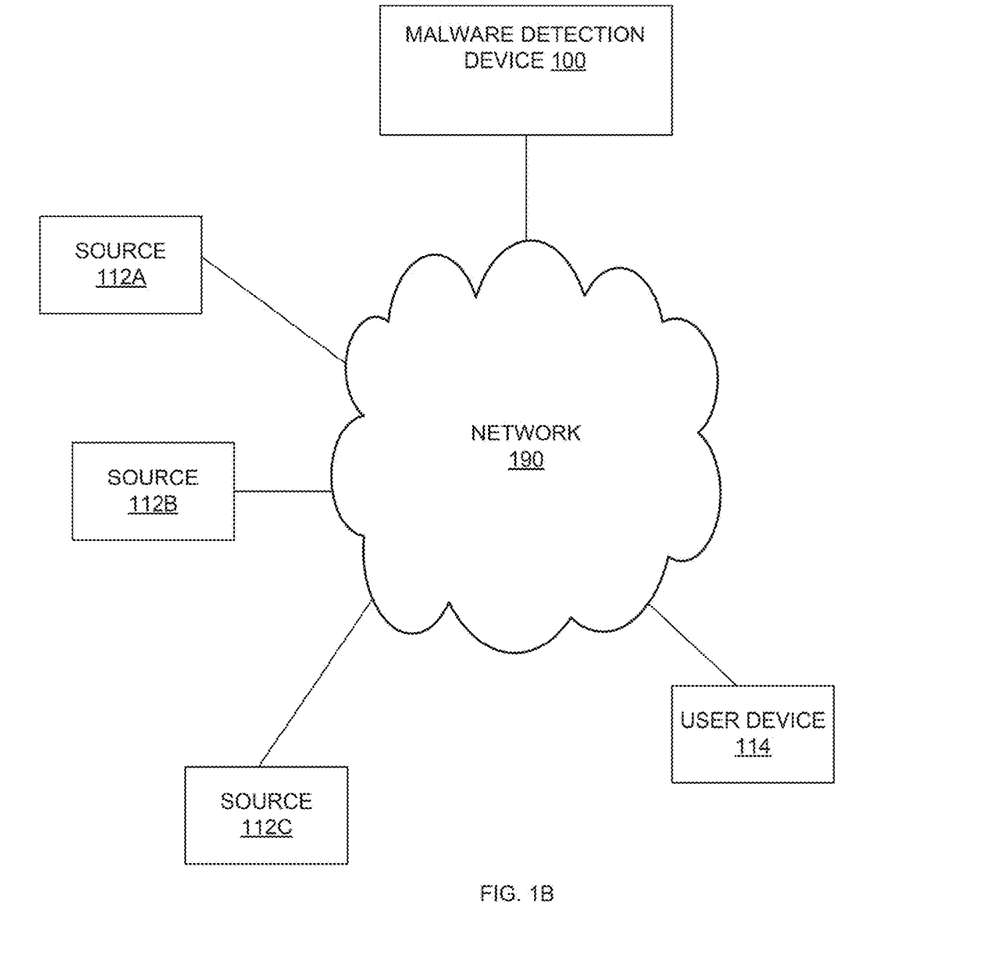
FIG. 1B is an example illustration of the malware detection device of FIG. 1A in a typical use setting, according to an embodiment.

As illustrated in FIG. 1B, the malware detection device 100 can be in communication with one or more source devices 112A-112C, which include the collection of files. The malware detection device 100 can be operated and controlled by a user device 114 such as, for example, a compute device associated with an operator, an administrator, a device associated therewith, and/or the like.

In some embodiments, as shown in FIG. 1B, a network 190 operatively couples the malware detection device 100 to other entities in the network 190, such as the source devices 112A-112C and/or (when the user device is remote) the user device 114. The network 190 can be any type of network that can operatively connect and enable data transmission between the malware detection device 100 and other entities in the network 190. The network 190 can be, for example, a wired network (an Ethernet, a local area network (LAN), etc.), a wireless network (e.g., a wireless local area network (WLAN), a Wi-Fi network, cellular network, etc.), or a combination of wired and wireless networks (e.g., the Internet, etc.). While shown and described as a single network, in other embodiments, the network can be multiple networks connected together to form a larger network (e.g., the Internet).

In some embodiments, the communication module 120 can be configured to receive one or more files from the source devices 112A-112C via the network 190, such as a collection of files, a target file, and/or the like. In some embodiments, the communication module 120 can be configured to search the network 190 (i.e., the devices within the network 190 and/or operatively coupled to the network 190) for files, on-demand or periodically. In some embodiments, the communication module 120 can be configured to search the network 190 via any suitable approach for the files, including, but not limited to, crawling/spidering (e.g., browses the internet, such as for the purpose of Web indexing), tracking (e.g., tracking changes to websites over time), scraping (e.g., extracting information from websites), and/or the like. In some embodiments, the communication module 120 is configured to filter, organize, modify and/or otherwise manipulate the search results in any suitable manner. In some embodiments, the communication module 120 can be further configured to receive files from a user of the malware detection device 100. For example, a user can provide a malware sample to the malware detection device 100. In some embodiments, the communication module 120 can be configured to receive the collection of files, and to send a signal (e.g., to the database module 124) to store the collection of files in the database 170 and/or the memory 160.

In some embodiments, the database module 124 can be configured to receive the one or more files from the communication module 120, and to store the files as a collection of files, such as in the database 170 and/or the memory 160. In some embodiments, the database module 124 is further configured to generate a database index of the files.

In some embodiments, the counter module 128 can be configured to count and/or determine the frequency of occurrence of one or more data features in the collection of files, though it is understood that the term "collection of files" is intended to encompass any subset thereof. The one or more data features can be pre-specified (e.g., a user can specify a data feature, and the collection of files are searched for the user-specified data feature), or can be determined based on the collection of files itself, or combinations thereof. Explained herein with reference to a single data feature for simplicity, in some embodiments, the count for the data feature can be a true or an exact measure of the frequency of the data feature. In other embodiments, the count for the data feature is an approximate measure that may or may not be equal to an exact or true measure. In other embodiments, the count for the data feature is an exact count (i.e., can be deterministic). In some embodiments, the count is a probabilistic measure for the data feature in the collection of files. Any suitable approximation and/or probabilistic technique can be employed for determining the count of the data feature in the collection of files including, but not limited to, an approximate counting algorithm that increments the count based on a probabilistic event, that determines whether a file should be counted based on the probability of the file having the data feature, and/or the like.

In some embodiments, the count is not the exact, true, or approximate measure, but a numerical equivalent thereof. For example, in some embodiments, the count is the logarithm value of an exact, true, or approximate measure. In this manner, large counts can be calculated yet maintained in smaller data structures. As discussed below, the count can be stored as a single base value (B) and an exponent value (E) and the count value at any give time can be represented as $B^E$. The exponent value can be incremented when a file is deemed to include the data feature. In some embodiments, the exponent value is initially set to zero, and is incremented with a probability based on the value of the exponent itself. For example, in some embodiments, the exponent is initially set to zero, and is incremented with a probability of $2^{-exponent}$ when a file is deemed to include the data feature. As an example, an exponent is initially set to 0, and is incremented to one with a probability of $2^E$ (i.e., 1 with E=0) when a file is deemed to include the data feature. Thus, once an initial data feature is identified, the exponent is incremented to 1 and the count value is $B^1$. The next instance a data feature is located and the exponent is incremented to two with a probability of $2^{-1}$ (i.e., 0.5) when another file is deemed to include the data feature. Similarly stated, the exponent is only incremented 50% of the time. Once the exponent is incremented, the count value is $B^2$. This process repeats as the exponent increases.

In some embodiments, the exponent value can be specified by a fixed number of bits, such as, for example, 8 bits. In the case of 8 bits, the exponent value can be incremented up to 256. The base value can be selected to tune the granularity of the count. For example, a counter with a base value of 1.04 and an 8-bit exponent value (maximum count value of 1.04^256=22936) is relatively more accurate/granular than one with a base value of 1 and an 8-bit exponent value (maximum count value of 2^256); the latter, however, can count to a relative higher value. The probability that the count is incremented can be based on the $2^{-count}$ parameter discussed above.

In some embodiments, the approximation and/or probabilistic counting technique can be lossy in nature; i.e., there is some loss in count accuracy, which is offset by the gains in speed, as well as lowered computational and/or memory requirements. For example, a Morris Counter can be used to count for the data feature(s) over a large collection of files numbering in the hundreds, thousands, and even millions. In some embodiments, the Morris Counter can be stored as a Bloom Filter.

In some embodiments, the counter is designed as a data structure (such as a vector) that can be used to perform a lookup on whether a file can be classified as having the data feature, and thereby counted. In some embodiments, the data structure of the counter represents an indexed series of bits initially set to zero. In some embodiments, the data structure can be made representative of one or more data features (also referred to as a "set of data features") by adding an indication of the data features to the data structure. In some embodiments, the data features are counted using the data structure in the following manner: the data feature is transformed one or more times, and the bits corresponding to the results of the transformation are used as indices into the data structure (e.g., a Bloom filter), such that the data feature's counter can be retrieved and/or manipulated. For example, transformation of the data feature in the file using a hashing function can yield an identifier, and a lookup of the identifier in the data structure can indicate whether the data feature should be counted. In some embodiments, the transformation includes one or more hashing functions. In some embodiments, the number of hashing functions employed depends on the size of the data structure (e.g., size of a vector). In some embodiments, the hashing functions employed includes simple hash, cryptographic hash, Murmur hash, Jenkins hash, Fowler-Noll-Vo (FNV) hash, and/or the like, and combinations thereof.

In some embodiments, filtering the collection of files for the data feature can include querying whether the file maps onto the data structure by transforming the file using the same transformations used to add the data features to the data structure. In some embodiments, the transformations include hash functions, and the collection of files is hashed to determine mapping onto the data structure. In some embodiments, a file is deemed to include the data feature if it maps onto the data structure of the counter; i.e., if the results of transforming the file provides index values for the data structure that are all set to 1. In this manner, a file likely includes the data feature if it maps onto the data structure, and definitively does not include the data feature if it does not map onto the data structure (i.e., if the results of transforming the file provides index values for the data structure, at least one of which is set to 0). In some embodiments, for example, a Bloom Filter can be employed as the data structure. In other examples, an associative array, such as a hash table chained with linked lists, can be employed to store data feature counts.

In some embodiments, the counter module 128 can be further configured to filter the collection of files for the data feature based on approximation and/or probabilistic techniques. In some embodiments, the approximation and/or probabilistic filtering technique can be lossy in nature; i.e., there is some loss in filtering accuracy. As an example, in some embodiments, a classification approach based on the Bayes theorem, such as a naïve Bayes classifier, can be employed by the counter module 128 to filter the collection of files. In some embodiments, the filter indicates whether a file either definitely does not have the data feature(s) or may have the data feature(s). For example, such a naïve Bayes classifier can be used to identify noise vs. natural language in a document. In such an example, the noise would be filtered out and only natural language results are used and/or counted.

In some embodiments, both a counter and a filter can be employed. In some embodiments, at least one of the counter and the filter employs a probabilistic technique. In some embodiments, the filtering can be performed prior to or subsequent to counting the frequency of occurrence of the data feature. In some embodiments, both the counter and the filter can use probabilistic techniques. As an example, the filter can be a Naïve Bayes filter, and the counter can be based on a Bloom Filter, a Morris Counter, or both. As another example, in some embodiments, the data structure of the counter, as described above, can be modified to include more than one bit at each index position, and to use all the bits at each position for counting. In this manner, the filtering aspect can determine whether a file maps onto the data structure (e.g., when the file likely includes the data feature), and the counting aspect can determine, if a file maps onto the data structure, whether the counter is updated based on its previous value. As another example, multiple counters/data structures of varying sizes can be employed, and transitioning successively from the largest data structure to the smallest data structure can performed based on a probabilistic counting method. As yet another example, a hybrid approach can be employed that combines the last two examples, where multiple counters/data structures are employed. In such an example, each counter can have more than one bit at each index position that is used for probabilistic counting, and the transition between counters/data structures is performed based on the same or a different probabilistic counting approach.

Examples of such combined probabilistic techniques for counting include Morris Counters, Morris Bloom Counters, Transition Bloom Counters, Transition Morris Bloom Counters, and/or the like. Generally, such counters that act on probabilistic representations of sets of data, such as the data features in the collection of files, provide at least two significant benefits: they can yield large gains in 1) data structure space and 2) algorithm speed, in return for a small loss in accuracy. Such probabilistic counting techniques allow, for example, data features such as windowed sequences of bytes extracted from the collection of files, to be counted at scale on systems such as personal computing systems having ordinary processing ability. Such scalable, probabilistic counting techniques are of particular relevance to representing malware features because, given the obfuscation employed by malware authors, it can be beneficial to represent malware artifacts using multiple kinds of data features, which can be quite numerous. For example, if a malware program has 10 megabytes of data, it can have as many as 10 million data features (e.g., windowed data byte features).

In some embodiments, the signature generation module 132 can be configured to generate a malware signature (also termed a "detection model"), such as for a specific malware, based on the frequency of the data feature in the collection of files and/or counts associated with the one or more data features in the collection of files, as described in more detail below. In some embodiments, the signature generation module 132 can be configured to receive a selection of malware files from the collection of files (i.e., a subset of the collection of files). The malware files can be a subset of the collection of files and can be associated with the specific malware. The term "malware file" as used herein for purposes of specifying a selection of malware files, is used to denote a file known to be the specific malware, likely to be the specific malware, or specified by a user to be malware. In some embodiments, the user specifies the selection of malware files.

The signature generation module 132 can be further configured to determine a frequency of occurrence of data features in the malware files (e.g., in concert with the counter module 128). For simplicity, assume the malware files include a single data feature, and $f_m$ denotes the frequency/count of the data feature in the malware files. The signature generation module 132 can be further configured to determine, and/or receive from the counter module 128, the frequency/count of occurrence of the single data feature in the collection of files (say $f_{all}$), which includes the malware files and non-malware files. The signature generation module 132 can be further configured to determine the probability that the feature is discriminative for the specific malware as $p_m = f_m / f_{all}$. The probability measure $p_m$ is a value between 0 and 1, where a value close to 1 indicates that the single data feature is found predominantly in the malware files. Accordingly, a file having the single data feature has a strong probability of being the specific malware (its $p_m$ is close to 1).

In some embodiments, the signal generation module 132 is configured to generate the malware signature based on a likelihood that the data feature is indicative of the malware associated with the malware signature. In some embodiments, the signature generation module 132 can be further configured to generate the signature for the specific malware from the probability measures for each data feature in the malware files in any suitable manner. In some embodiments, the signature includes a specification of one or more data features that are present in the target file. In some embodiments, the signature includes one or more criterion for the specified data features. For example, in some embodiments, the signature can specify that, Feature A (e.g., a specified byte sequence) must be present in the target file at least twice for that target file to be classified as the specific malware. In some embodiments, the signature includes a specification of an interrelationship between two or more data features specified in the signature. For example, the signature can specify that if Feature A and Feature B are included in the target file within n words of each other, the target file can be classified as the specific malware. In some embodiments, a data feature is included in the signature if it meets one or more criterion, such as a measure of likelihood that the target file is malware. For example, a data feature is included in the signature if the probability measure $p_m$ for the data feature crosses a threshold value, such as at least 0.6.

In some embodiments, the signature generation module 132 can be further configured to include one or more data features from the malware files in the signature based on a decision tree. In some embodiments, the signature generation module 132 can be further configured to include one or more data features from the malware files in the signature based on a probabilistic approach for clustering, classification, inference, and/or the like. In some embodiments, the probabilistic approach assumes the independence of the data features from each other; i.e., the likelihood of whether a file includes a particular data feature can be unrelated to the presence or absence of any other data feature. As an example, a classifier based on a Naïve Bayes model can be employed. As another example, a two-layer Bayesian Network based on Noisy-OR gates can be employed, with one layer defined as features that are highly discriminative of malware and a second layer containing a single node, the "is malware" Bernoulli distributed node. As yet another example, an automatically generated decision tree can be used, such that splits in the decision tree are generated on data features that are both common in the target malware (e.g., the malware files) and uncommon in the population of software (e.g., in the collection of files). When probabilistic approaches are used for determining the frequency of the one or more data features in the collection of files, benefits of the approaches described herein provide for improved signature construction based on potentially millions of features across millions of files, thereby accounting for the diversity of malware, without significant computational overhead.

In some embodiments, a user can manually specify that a data feature, found in the malware files or otherwise, should be included in the signature. In this manner, the signature can include data features either based on one or more automatically generated criterion, or manually specified by the user, or combinations thereof.

In some embodiments, the detection module 136 can be configured to receive a test/target file, such as from a user of the malware detection device 100 or via the network (e.g., via the I/O 180 or via the communication module 120), and can be further configured to identify and/or classify whether the test file is malware by comparing the test file against one or more signatures (generated by the signature generation module 132, as described above). In some embodiments, the test file is deemed to be a specific malware if the test file includes one or more of the data features in the signature for the specific malware. In some embodiments, the test file is deemed to be a specific malware if the test file includes one or more of the data features satisfying one or more criterion specified in the malware signature for the specific malware. In some embodiments, the test file is deemed to be a specific malware if the test file includes one or more of the data features satisfying an interrelationship specified in the signature for the specific malware.

In some embodiments, the detection module 136 can be configured to infer a measure of likelihood of whether the target file is the specific malware based on the signature corresponding to and/or associated with the specific malware. Said another way, the measure can be predictive, and it is not necessary for the target file to be the specific malware. The measure of likelihood can be established (for example) based on the extent to which the target file satisfies, maps, and/or otherwise meets the requirements set out in the signature. In some embodiments, the measure can be at least one of a qualitative measure (e.g., a descriptive indicator of the purported functionality), a binary measure (e.g., a yes/no indicator), a probabilistic measure (e.g., a number between 0 and 1, including values and sub ranges in-between), a percentage measure (e.g., greater than 50%, less than 15% chance, between 20-25% chance, and/or the like), and/or the like.

In some embodiments, the detection module 136 can be further configured to take one or more actions based on identifying whether the test file is malware, including transmitting an indication of the result (e.g., that of the classification of the target file as the malware) to a user in any suitable format (e.g., text, graphic, audio, video, and/or the like). In some embodiments, the indication can include a recommended action such as, for example, when the indication communicates that the file is identified as potential malware, and can include a recommendation to delete the file, to run an anti-malware application, to automatically remove the file, to automatically quarantine the file, and/or the like.

Figure 2:
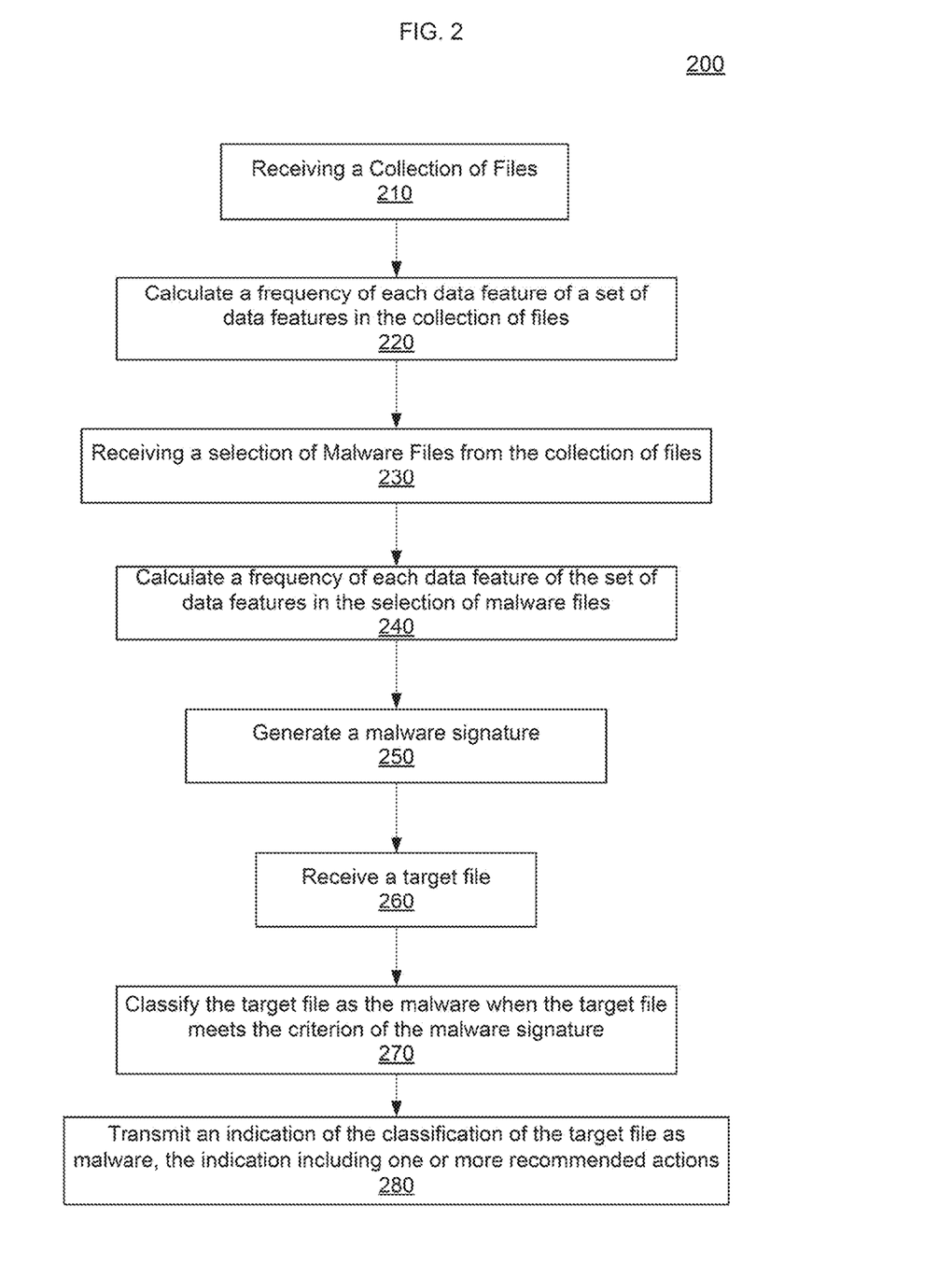
FIG. 2 is a method of determining whether a target file is malware, according to an embodiment.

FIG. 2 illustrates a method 200 for evaluating whether a target file is malware, according to an embodiment. Explained with reference to the malware detection device 100, at 210, a collection of files is received and/or otherwise retrieved from the database 170 and/or the memory 160. At 220, a frequency of each data feature of a set of data features in the collection of files is counted. In some embodiments, a probabilistic approach is used for counting the data features in the collection of files. In some embodiments, the probabilistic approach includes a Morris Counter. In some embodiments, the probabilistic approach includes a Bloom filter. In some embodiments, the probabilistic approach includes a Morris Bloom Counter (i.e., combines a Morris Counter stored as a Bloom Filter).

At 230, a selection of malware files from the collection of files is received. At 240, a frequency of each data feature of the set of data features in the selection of malware files is counted. At 250, a malware signature is generated based on the frequency of each data feature in the collection of files and based on the frequency of each data feature in the selection of malware files. The malware signature is associated with the malware and includes an indication of a criterion for one or more data features of the set of data features.

At 260, a target file is received. At 270, the target file is compared against the signature to identify whether the target file is the specific type of malware, and the target file is classified the target file as the malware when the target file meets the criterion of the malware signature. In some embodiments, identifying whether the target file is the specific type of malware includes calculating a likelihood that the target file is the specific type of malware.

At 270, an indication of the classification of the target file as malware is transmitted (e.g., to a user interface for presentation to a user). The indication can include one or more recommended actions and/or one or more automatic actions.

Figure 3:
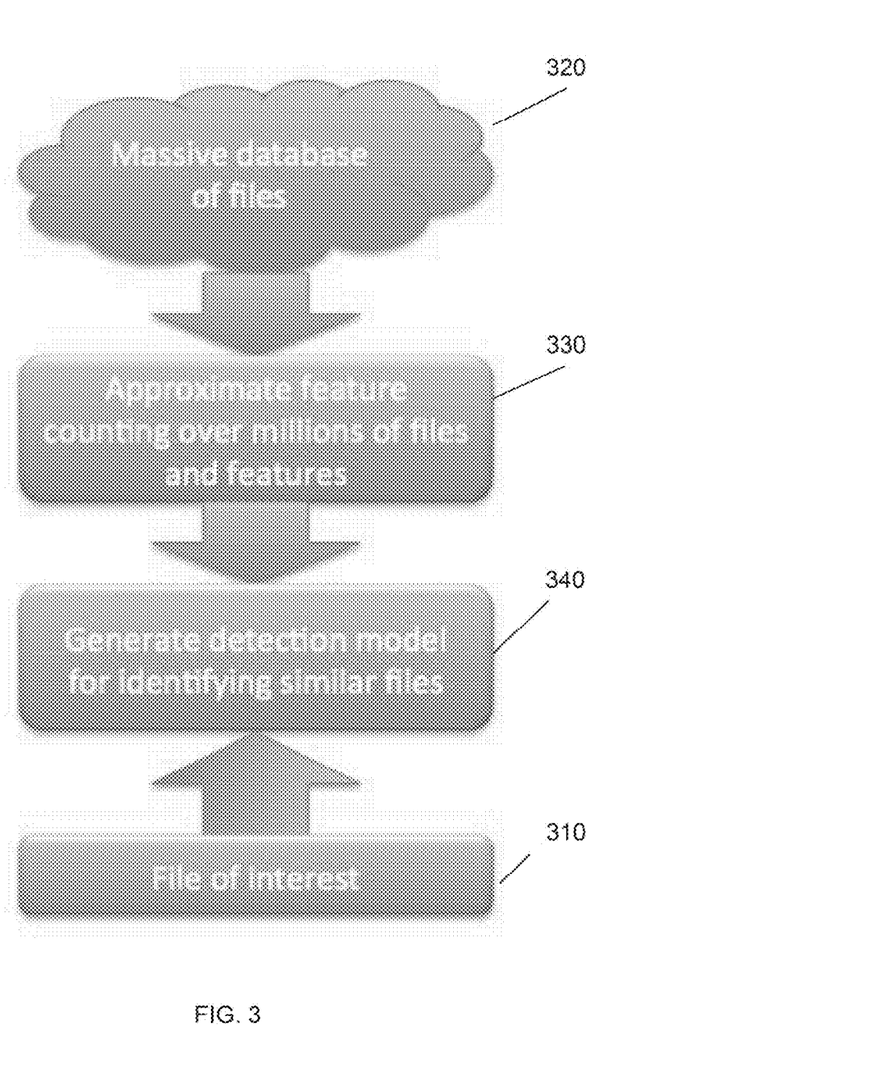
FIG. 3 is an example method of malware detection, according to an embodiment.

FIG. 3 illustrates an example approach to malware detection in a file of interest 310. A database of files 320, such as the database 170 and/or the memory 160, or even the sources 112A-112C (see FIG. 1B), form the basis for generating signatures for specific types of malware. The database can potentially contain millions of files, spanning millions of data features. At 330, approximate and/or probabilistic feature counting can be performed over the millions of files. At 340, signatures or detection models for a specific type of malware can be created based on the feature counting for the millions of files, as well as based on feature counting for similar files for the specific malware. The file of interest can then be compared against the detection models to determine of the file is malware.

In some embodiments, for example, malware signature generation can be reasoned about in terms of feature frequencies (e.g., frequency of data features). In some instances, rare features found in a malware sample, assuming they are not randomization/compression/encryption artifacts, can be the best features for detection. An example of a rare feature can be a printable string extracted from files that is 1) relatively rare in the population of software and 2) is genuine natural language (i.e., is not an artifact of code, ciphertext and/or compressed data). One (first) problem is there can be an unlimited number of features and an unlimited number of observations, yet limited memory and CPU resources. For example, there can be 5.1 billion unique printable string features for a 30 million sample (e.g., in a collection of files) dataset. Another (second) problem is that some features may be random artifacts that occur in one variant of a malware, but not in others.

Figure 4:
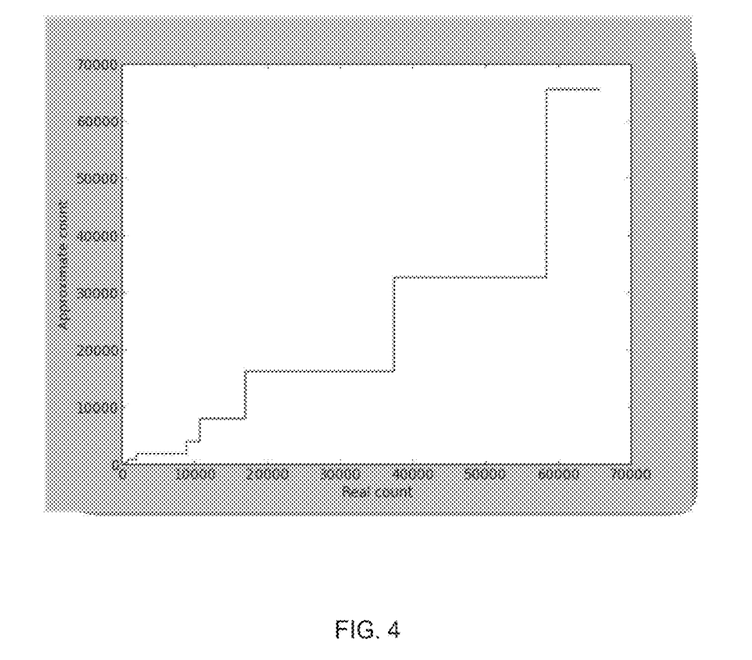
FIG. 4 is an example plot of real feature counts vs. approximate feature counts, illustrating Morris Counting, according to an embodiment.

In some embodiments, a solution to the first problem can be automatic signature generation using Morris-Bloom Counting as described herein. Morris counting is used for compact approximation of feature counts is achieved by storing/counting exponent values (see FIG. 4). The exponent value can be incremented by one, and/or any other suitable number, in a randomized manner so as to approximate the true count. In some embodiments, an adapted Bloom filter is used for indexing of the Morris counter. Such Bloom filters yield no false positives, but are prone to false negatives. In some instances, the indexing can be done using an 8-bits per register and a hash function, employing a 32 MB data structure.

Figure 5:
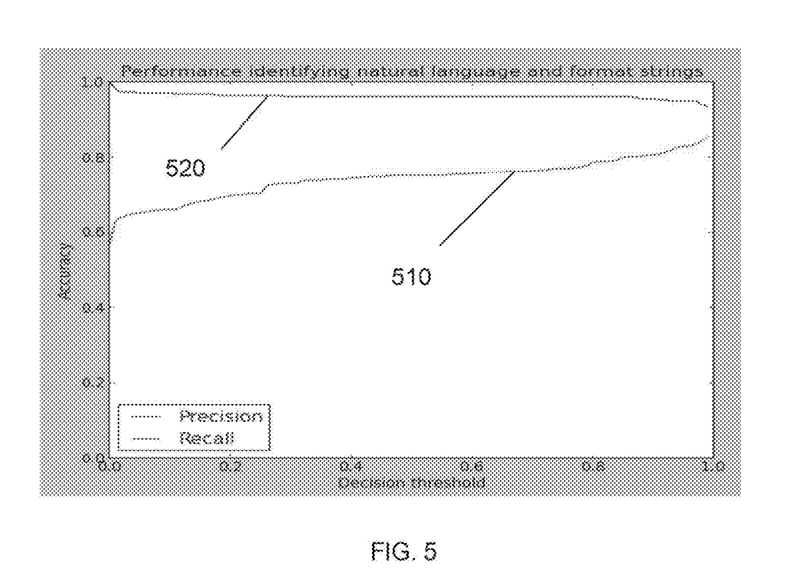
FIG. 5 is an example plot illustrating accuracy of a string noise filtering approach based on a decision threshold employed by a Naïve Bayes binary classifier that evaluates whether a string of characters should be considered to be natural language or not.
Figure 6:
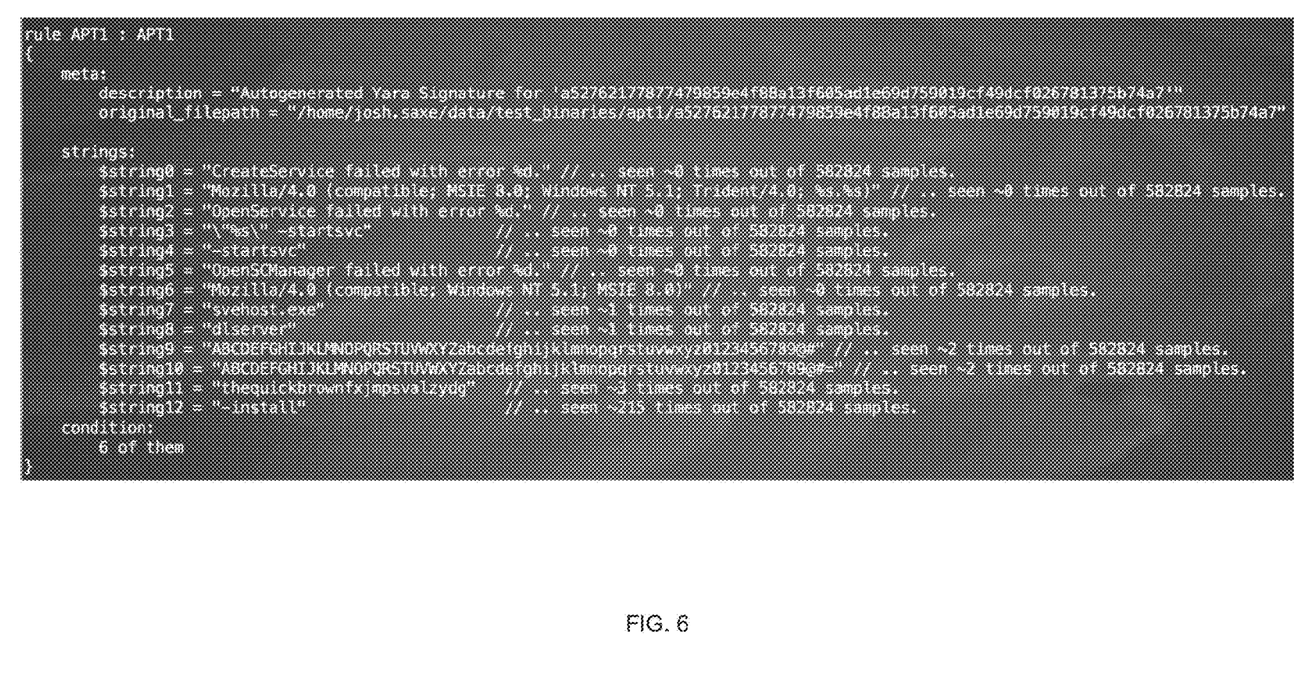
FIG. 6 is an example malware signature, according to an embodiment.

In some embodiments, a solution to the second problem, for the specific artifact that is printable string compression, is filtering printable string compression artifacts using a Naïve Bayes character trigram model. Generally, strings are sequences of printable characters that can be extracted from binary files. Strings in malware can contain signs of the file being malware such as an indication of a malware family, an indication of a time of malware generation, and/or the like. Naïve Bayes is a statistical model that can be used for binary classification. In some instances, a Naïve Bayes model can be trained on trigrams extracted from natural language documents, so that the model can recognize natural language. In some embodiments, the Naïve Bayes approach can model noise as a uniform distribution over all possible character trigrams. In some embodiments, the natural language documents can include at least a portion of the collection of files. The probability that each printable string is either technical language or "noise" can then be inferred. The result is an accurate model (see FIG. 5) for filtering compression/encryption/binary noise from printable strings. FIG. 6 illustrates the resulting automatically generated signature. FIG. 5 illustrates an example where modifying a "decision threshold", i.e., a threshold for the probability value of a Naïve Bayes model that a string is natural language, can affect precision 510 of the model. Here, increasing decision threshold values lead to increasing precision 510, while leading to a minor drop in recall 520 (i.e., the true positive rate of accurate detection/classification/filtering).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus, comprising:
a memory; and
a processor operatively coupled to the memory, the processor configured to receive a file having a plurality of data features,
the processor configured to define a vector data structure associated with the file and having a plurality of counters, each counter from the plurality of counters (1) having an index value and (2) storing a probabilistic count associated with at least one data feature from the plurality of data features,
the processor configured to extract from the file each data feature from the plurality of data features,
for each data feature from the plurality of data features, the processor configured to:
transform that data feature to identify an index value associated with that data feature,
access a counter from the plurality of counters based on the index value of the counter corresponding to the index value associated with that data feature,
determine, based on a probability associated with the probabilistic count of the counter, whether to increment the probabilistic count of the counter, the processor configured to generate a malware signature associated with the file based on an approximate count of each data feature from the plurality of data features in the file as indicated by the vector data structure.

2. The apparatus of claim 1, wherein the processor is configured to transform that data feature by providing an indication of that data feature to a hash function, the index value associated with that data feature being an output of the hash function.

3. The apparatus of claim 1, wherein each counter from the plurality of counters is a Morris counter and the vector data structure is a Bloom filter.

4. The apparatus of claim 1, wherein the processor is configured to:
receive a target file; and
classify the target file as malicious when the target file meets one or more criterion of the malware signature.

5. The apparatus of claim 1, wherein each data feature from the plurality of data features is at least one of a keyword, an Application Programming Interface (API) symbol, an indication of a Dynamic Link Library (DLL) file import function, or an indication of a function for accessing a registry key.

6. A non-transitory processor-readable medium storing code representing instructions to be executed by a processor, the code comprising code to cause the processor to:
define a vector data structure having a plurality of counters, each counter from the plurality of counters (1) having an index value and (2) storing a probabilistic count;
identify a data feature within a file;
transform the data feature to determine an index value associated with the data feature;
access a counter from the plurality of counters based on the index value of the counter corresponding to the index value associated with the data feature;
determine, based on a probability associated with the probabilistic count of the counter, whether to increment the probabilistic count of the counter; and
generate a malware signature associated with the file based on the vector data structure.

7. The non-transitory processor-readable medium of claim 6, wherein the code to cause the processor to transform includes code to cause the processor to provide an indication of the data feature to a hash function, the index value associated with the data feature being an output of the hash function.

8. The non-transitory processor-readable medium of claim 6, wherein the probability is calculated using the probabilistic count as an exponent to a predefined base value.

9. The non-transitory processor-readable medium of claim 6, wherein each counter from the plurality of counters is a Morris counter and the vector data structure is a Bloom filter.

10. The non-transitory processor-readable medium of claim 6, wherein the data feature is from a plurality of data features within the file,
the code to cause the processor to generate includes code to cause the processor to generate the malware signature based on the probabilistic count of each counter from the plurality of counters after each data feature from the plurality of data features has been identified.

11. The non-transitory processor-readable medium of claim 6, further comprising code to cause the processor to:
receive a target file; and
classify the target file as malicious when the target file meets one or more criterion of the malware signature.

12. The non-transitory processor-readable medium of claim 6, wherein the counter from the plurality of counters represents an approximate count of the data feature in the file.

13. The non-transitory processor-readable medium of claim 6, wherein the data feature is from a plurality of data features within the file,
each data feature from the plurality of data features being associated with a different counter from the plurality of counters.

14. The non-transitory processor-readable medium of claim 6, wherein the data feature is at least one of a keyword, an Application Programming Interface (API) symbol, an indication of a Dynamic Link Library (DLL) file import function, or an indication of a function for accessing a registry key.

15. A method, comprising:
receiving a malicious file;
extracting a data feature from the malicious file;
transforming the data feature to determine an index value associated with the data feature;
accessing, using the index value, a probabilistic counter associated with the data feature and from a plurality of probabilistic counters within a vector data structure associated with the malicious file;
determine, based on a probability associated with a value of the probabilistic counter, whether to increment the value of the probabilistic counter; and
generate a signature associated with the malicious file based on the vector data structure.

16. The method of claim 15, wherein the transforming includes providing an indication of the data feature to a hash function, the index value associated with the data feature being an output of the hash function.

17. The method of claim 15, wherein each probabilistic counter from the plurality of probabilistic counters is a Morris counter and the vector data structure is a Bloom filter.

18. The method of claim 15, further comprising:
receiving a target file; and
classifying the target file as malicious when the target file meets one or more criterion of the signature.

19. The method of claim 15, wherein the data feature is from a plurality of data features within the malicious file,
each data feature from the plurality of data features being associated with a different probabilistic counter from the plurality of probabilistic counters.

20. The method of claim 15, wherein the data feature is at least one of a keyword, an Application Programming Interface (API) symbol, an indication of a Dynamic Link Library (DLL) file import function, or an indication of a function for accessing a registry key.

21. The method of claim 15, wherein the probabilistic counter from the plurality of probabilistic counters represents an approximate count of a frequency of the data feature in the malicious file.

* * * * *

UNITED STATES PATENT AND TRADEMARK OFFICE
CERTIFICATE OF CORRECTION

PATENT NO. : 10,474,818 B1  
APPLICATION NO. : 15/907817  
DATED : November 12, 2019  
INVENTOR(S) : Joshua Daniel Saxe Page 1 of 1

It is certified that error appears in the above-identified patent and that said Letters Patent is hereby corrected as shown below:

In the Specification

Column 1, Line 10:
"MALWARE," which claims priority to U.S. Provisional" should be -- MALWARE," now U.S. Patent No. 9,940,459, which claims priority to U.S. Provisional --

Column 1, Lines 12-13:
"DEVICES FOR DETECTION OF MALWARE", now U.S. Pat. No. 9,940,459, filed May 19, 2014, the entire disclosure" should be -- DEVICES FOR DETECTION OF MALWARE", filed May 19, 2014, the entire disclosure --

Signed and Sealed this
Seventeenth Day of March, 2020

Andrei Iancu
*Director of the United States Patent and Trademark Office*